United States Patent
Ramachandra et al.

(10) Patent No.: US 11,140,590 B2
(45) Date of Patent: Oct. 5, 2021

(54) HANDLING NEIGHBOUR RELATIONSHIPS

(71) Applicant: Telefonaktiebolaget LM Ericsson (publ), Stockholm (SE)

(72) Inventors: Pradeepa Ramachandra, Linköping (SE); Stefan Engström, Linköping (SE); Reza Moosavi, Linköping (SE); Claes Tidestav, Bålsta (SE); Andres Reial, Malmö (SE); Icaro Leonardo J. Da Silva, Solna (SE); Fredrik Gunnarsson, Linköping (SE); Kristina Zetterberg, Linköping (SE); Pål Frenger, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/349,331

(22) PCT Filed: Nov. 8, 2017

(86) PCT No.: PCT/SE2017/051112
§ 371 (c)(1),
(2) Date: May 13, 2019

(87) PCT Pub. No.: WO2018/093315
PCT Pub. Date: May 24, 2018

(65) Prior Publication Data
US 2019/0297545 A1    Sep. 26, 2019

Related U.S. Application Data

(60) Provisional application No. 62/422,139, filed on Nov. 15, 2016.

(51) Int. Cl.
*H04W 36/00* (2009.01)
*H04W 76/11* (2018.01)
(Continued)

(52) U.S. Cl.
CPC ..... *H04W 36/00835* (2018.08); *H04L 5/0051* (2013.01); *H04W 8/08* (2013.01);
(Continued)

(58) Field of Classification Search
None
See application file for complete search history.

(56) References Cited

U.S. PATENT DOCUMENTS 9,294,970 B1 * 3/2016 Sitaram ........... H04W 36/00835
9,326,196 B1 * 4/2016 Sitaram ........... H04W 36/00835
(Continued)

FOREIGN PATENT DOCUMENTS

CN    103053199 A    4/2013
CN    109792654 A    5/2019
(Continued)

OTHER PUBLICATIONS

Ericsson, "R1-1611916: Enabling beam grouping by UE in mobility RS measurements," 3GPP TSG-RAN WG1 Meeting #87, Nov. 14-18, 2016, Reno, NV, USA, 8 pages.
(Continued)

*Primary Examiner* — Andrew C Oh
(74) *Attorney, Agent, or Firm* — Withrow & Terranova, PLLC

(57) ABSTRACT

Embodiments herein relate to a method performed by a second network node for handling neighbour relationships between radio network nodes in a wireless communication network. The second network node initiates a neighbour relationship establishment process in the wireless communication network by transmitting an indication to a second radio network node or a first network node. The indication indicates the second radio network node to transmit an identifier of a reference signal handler associated with a
(Continued)

reference signal of the second radio network node along with a transmission of the reference signal.

10 Claims, 13 Drawing Sheets

(51) Int. Cl.
  *H04L 5/00* (2006.01)
  *H04W 8/08* (2009.01)
  *H04W 24/08* (2009.01)
  *H04W 48/12* (2009.01)

(52) U.S. Cl.
  CPC ............ *H04W 24/08* (2013.01); *H04W 76/11* (2018.02); *H04W 48/12* (2013.01)

(56) References Cited

U.S. PATENT DOCUMENTS

| | | | | |
|---|---|---|---|---|
| 9,705,739 | B1* | 7/2017 | Vivanco | H04W 24/02 |
| 9,723,535 | B1* | 8/2017 | Marupaduga | H04W 36/14 |
| 2010/0061339 | A1* | 3/2010 | Kim | H04W 36/0005 370/331 |
| 2010/0062793 | A1* | 3/2010 | Sun | G01S 19/51 455/456.3 |
| 2010/0291929 | A1* | 11/2010 | Stephens | H04W 24/02 455/436 |
| 2011/0237258 | A1* | 9/2011 | Nylander | H04J 11/0093 455/437 |
| 2011/0263282 | A1* | 10/2011 | Rune | H04W 36/00835 455/507 |
| 2012/0009957 | A1* | 1/2012 | Murasawa | H04W 8/26 455/507 |
| 2012/0100884 | A1* | 4/2012 | Radulescu | H04W 36/0085 455/524 |
| 2012/0106370 | A1 | 5/2012 | Radulescu et al. | |
| 2012/0195255 | A1* | 8/2012 | Nylander | H04W 60/04 370/328 |
| 2013/0003695 | A1* | 1/2013 | Nylander | H04W 36/00837 370/331 |
| 2013/0084884 | A1* | 4/2013 | Teyeb | H04W 48/04 455/456.1 |
| 2013/0322390 | A1* | 12/2013 | Xu | H04W 92/20 370/329 |
| 2014/0192781 | A1* | 7/2014 | Teyeb | H04W 36/36 370/331 |
| 2014/0304857 | A1* | 10/2014 | Ayele | C12N 15/8216 800/287 |
| 2015/0029877 | A1* | 1/2015 | Chen | H04W 52/0209 370/252 |
| 2015/0208339 | A1* | 7/2015 | Wellington | H04W 48/20 455/435.1 |
| 2015/0215774 | A1* | 7/2015 | Huang | H04W 76/11 455/422.1 |
| 2016/0029253 | A1 | 1/2016 | Sarkar et al. | |
| 2016/0150453 | A1* | 5/2016 | Narayanan | H04W 36/0061 455/436 |
| 2016/0242080 | A1 | 8/2016 | Vikberg et al. | |
| 2016/0302122 | A1* | 10/2016 | Masini | H04L 61/6063 |
| 2017/0055186 | A1* | 2/2017 | Donepudi | H04W 4/026 |
| 2017/0339602 | A1* | 11/2017 | Bergstrom | H04W 36/30 |
| 2017/0366981 | A1* | 12/2017 | Takano | H04B 7/0632 |
| 2017/0374587 | A1* | 12/2017 | Liu | H04L 5/0048 |
| 2018/0049055 | A1* | 2/2018 | Wiberg | H04W 72/044 |
| 2018/0249430 | A1* | 8/2018 | Moosavi | H04L 5/0048 |
| 2018/0316452 | A1* | 11/2018 | Chen | H04W 76/20 |
| 2019/0098524 | A1* | 3/2019 | Yiu | H04W 76/27 |
| 2019/0246322 | A1* | 8/2019 | Ronkainen | H04W 36/06 |
| 2019/0357100 | A1* | 11/2019 | Ramachandra | H04W 36/0094 |
| 2020/0084681 | A1* | 3/2020 | Frenger | H04W 8/08 |

FOREIGN PATENT DOCUMENTS

| | | |
|---|---|---|
| WO | 2010107356 A1 | 9/2010 |
| WO | 2011016804 A1 | 2/2011 |
| WO | 2015039311 A1 | 3/2015 |
| WO | 2015082577 A1 | 6/2015 |
| WO | 2015122812 A1 | 8/2015 |
| WO | 2016082940 A1 | 6/2016 |
| WO | 2018063069 A1 | 4/2018 |

OTHER PUBLICATIONS

Supplementary European Search Report for European Patent Application No. 17872006.6, dated Jul. 24, 2019, 5 pages.
Author Unknown, "Technical Specification Group Services and System Aspects; Study on Architecture for Next Generation System (Release 14)," Technical Report 23.799, Version 0.5.0, 3GPP Organizational Partners, May 2016, 178 pages.
Author Unknown, "Technical Specification Group Radio Access Network; Study on Scenarios and Requirements for Next Generation Access Technologies; (Release 14)," Technical Report 38.913, Version 0.3.0, 3GPP Organizational Partners, Mar. 2016, 30 pages.
NTT Docomo, "RP-160671: New SID Proposal: Study on New Radio Access Technology," Third Generation Partnership Project (3GPP), TSG RAN Meeting #71, Mar. 7-10, 2016, 8 pages, Göteborg, Sweden.
Ramachandra, Pradeepa, et al., "On Automatic Establishment of Relations in 5G Radio Networks," IEEE 27th Annual International Symposium on Personal, Indoor, and Mobile Radio Communications (PIMRC): Workshop: 6th International Workshop on Self-Organizing Networks (IWXON), IEEE, Sep. 4-8, 2016, Valencia, Spain, 6 pages.
International Search Report and Written Opinion for International Patent Application No. PCT/SE2017/051112, dated Jan. 23, 2018, 16 pages.
Examination Report for European Patent Application No. 17872006.6, dated Sep. 12, 2019, 9 pages.
Examination Report for European Patent Application No. 17872006.6, dated Feb. 21, 2020, 6 pages.
Intention to Grant for European Patent Application No. 17872006.6, dated Dec. 10, 2020, 5 pages.
First Office Action for Chinese Patent Application No. 201780082963.2, dated Dec. 28, 2020, 17 pages.

* cited by examiner

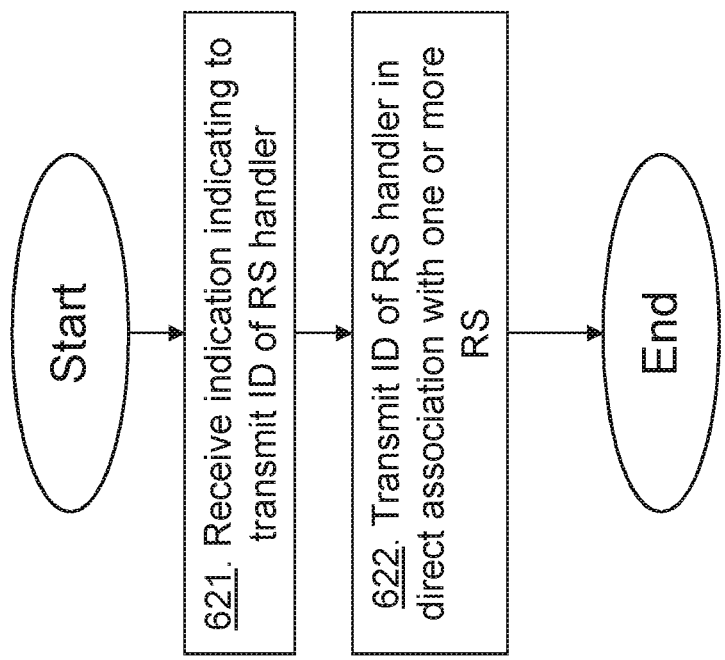

HANDLING NEIGHBOUR RELATIONSHIPS

This application is a 35 U.S.C. § 371 national phase filing of International Application No. PCT/SE2017/051112, filed Nov. 8, 2017, which claims the benefit of U.S. Provisional Application No. 62/422,139, filed Nov. 15, 2016, the disclosures of which are incorporated herein by reference in their entireties.

TECHNICAL FIELD

Embodiments herein relate to a network node, radio network nodes and methods performed therein regarding wireless communication. Furthermore, a computer program and a computer-readable storage medium are also provided herein. Especially, embodiments herein relate to handling neighbour relationships, e.g. establishment of neighbour relationships, between radio network nodes in a wireless communication network.

BACKGROUND

In a typical wireless communication network, wireless devices, also known as wireless communication devices, mobile stations, stations (STA) and/or user equipments (UE), communicate via a Radio access Network (RAN) to one or more core networks (CN). The RAN covers a geographical area which is divided into service areas or cell areas, with each service area or cell area being served by network node such as an access node e.g. a Wi-Fi access point or a radio base station (RBS), which in some networks may also be called, for example, a "NodeB" or "eNodeB". The service area or cell area is a geographical area where radio coverage is provided by the access node. The access node operates on radio frequencies to communicate over an air interface with the wireless devices within range of the access node. The access node communicates over a downlink (DL) to the wireless device and the wireless device communicates over an uplink (UL) to the access node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipments. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several access nodes may be connected, e.g., by landlines or microwave, to a controller node, such as a radio network controller (RNC) or a base station controller (BSC), which supervises and coordinates various activities of the plural access nodes connected thereto. The RNCs are typically connected to one or more core networks.

Specifications for the Evolved Packet System (EPS) have been completed within the 3$^{rd}$ Generation Partnership Project (3GPP) and this work continues in the coming 3GPP releases, such as 4G and 5G networks. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the access nodes are directly connected to the EPC core network. As such, the Radio Access Network (RAN) of an EPS has an essentially "flat" architecture comprising access nodes connected directly to one or more core networks.

With the emerging 5G technologies, the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Beamforming allows the signal to be stronger for an individual connection. On the transmit-side this may be achieved by a concentration of the transmitted power in the desired direction(s), and on the receive-side this may be achieved by an increased receiver sensitivity in the desired direction(s). This beamforming enhances throughput and coverage of the connection. It also allows reducing the interference from unwanted signals, thereby enabling several simultaneous transmissions over multiple individual connections using the same resources in the time-frequency grid, so-called multi-user Multiple Input Multiple Output (MIMO).

Overall requirements for the Next Generation (NG) architecture e.g. TR 23.799 v.0.5.0, and, more specifically the NG Access Technology, e.g. TR 38.913 v.0.3.0 will impact the design of the Active Mode Mobility solutions for the New Radio Access Technology, see RP-160671 New SID Proposal: Study on New Radio Access Technology, DoCoMo, compared to the current mobility solution in LTE. Some of these requirements are the need to support network energy efficiency mechanisms, future-proof-ness and the need to support a very wide range of frequencies e.g. up to 100 GHz.

The proposed solution for downlink based active mode mobility in New Radio (NR) is depicted in FIG. 1. A wireless device is served by the leftmost node but is traveling in the direction towards the rightmost node, depicted by the dashed arrow in the FIG. 1. The wireless device uses a best home Mobility Reference Signal (MRS) for coarse timing estimation and radio link quality monitoring and failure detection (shown as the striped oval in the figure), e.g. used for sync reference for active mode reference signal for Radio link monitoring (RLM) and/or radio link failure detection.

In addition, the wireless device monitors a sparse periodic MRS, such as synchronization signal (SS) block from a serving network node and compares it with similar periodic and sparse MRSs from potential target nodes. When a target network node becomes relevant for a more detailed handover procedure, additional dynamically configured home MRSs, such as Channel State Information Reference Signal (CSI-RS), and dynamically configured away MRSs may be activated.

The final handover decision is taken by the network and it is based on wireless device reports containing measurement of home MRSs, e.g. dynamically configured MRSs, and away MRSs, e.g. dynamically triggered away MRSs. MRSs are those reference signals that are used for the Radio resource management (RRM) measurements related to mobility purposes.

An example embodiment of the proposed system information acquisition for 5G NR is depicted in FIG. 2. In the example each radio network node, also referred to as Transmission and Reception Point (TRP) or radio base station (RBS) such as eNB or gNB, transmits a synchronization signal or a system signature signal (SS). Together with the SS each network node also transmits a physical broadcast channel (PBCH) containing some of the minimum system information that the wireless device needs to access the radio network node. This part of the minimum system information is denoted as master information block (MIB) in FIG. 2. The transition of SS and the PBCH containing the MIB is denoted with dashed ovals in FIG. 2.

By reading the MIB the wireless device receives information on how to receive the system information block (SIB) table. The SIB table may be transmitted using a broadcast format such as single frequency network (SFN) transmission and it is depicted with a covering oval in FIG. 2.

In addition to the minimum system information that is periodically broadcasted in by the SS+MIB and in the SIB-table the wireless device may receive other or additional system information e.g. by a dedicated transmission after initial access is established (depicted with a dotted oval in FIG. 2).

In order for the proposed active mode mobility solution depicted in FIG. 1 to work, the serving radio network node needs to know the identity of the neighbouring radio network node. If a wireless device reports an away MRS then the serving radio network node needs to know which neighbouring radio network node is transmitting the away MRS.

If a wireless device reports an unknown away MRS then the automatic neighbour relation (ANR) algorithm is supposed to identify the source of the MRS and set up a neighbour relation. In LTE this is done by requesting the wireless device to read a cell global identity (CGI) associated with the measurement and reporting this cell global identity to the serving radio network node. The serving radio network node then contacts a server in the wireless communication network and receives the IP-address of the network node with said CGI and initiates a neighbour relationship setup procedure.

In NR, which is designed to support high gain and dynamic beamforming, e.g. by means of utilizing hundreds of antenna elements at the network node (so called massive MIMO), this solution may not work. This is depicted in FIG. 3. In NR a typical situation is that a wireless device reports an unknown "away MRS" but then it cannot read any system information, such as the SS+MIB, of the corresponding network node. Therefore, even if we would transmit a cell global identity in the MIB in NR the ANR algorithm may still fail.

A procedure of "release and redirect" in which the wireless device is released from the serving radio network node with an instruction to connect to the new unknown node and inform the new unknown node about the CGI of the old source node such that the new node may initiate the ANR establishment has been discussed as a solution to this problem. But, as depicted in FIG. 3, it is possible that the wireless device may hear another SS+MIB (dashed transmission of $SS_2$ and dotted of $SS_3$ in the figure) but it may be the wrong one.

If ANR does not work, then the radio network node cannot figure out what an MRS comparison means. And a handover, e.g. move the wireless device context, re-direct backhaul traffic, assign contention free Physical Random Access Channel (PRACH), etc, cannot be prepared in time.

Figuring out the SS associated with a particular MRS does not help much since the SS identity (SSI) is not globally unique, and the problem is moved from the MRS-domain to the SSI-domain. Many radio network nodes in the network transmit $SS_3$ and the radio network node does not know which one transmitted the reported $SS_3$.

Without a working ANR solution for NR, the active mode mobility solution does not work which may lead to a reduced or limited performance of the wireless communication network.

SUMMARY

One way of establishing the neighbour relation is to transmit an ANR handler identifier or identity of an MRS handler along with periodic MRSs. An example embodiment of the solution is depicted in FIG. 4. Periodically after e.g. N MRS transmissions a new physical channel is inserted carrying the MRS handler identity. In FIG. 4 N=4. This physical channel is transmitted using the same beamforming parameters as the associated MRS to ensure identical coverage.

An example how the physical channel for transmitting the MRS handler identity may be designed is depicted in FIG. 5. The MRS is used as a reference signal for the physical channel that follows directly after it (in this example). However, as the MRS handler identity may consume large number of resources (it has to be unique and hence larger size) such a solution will lead to waste of the resources in a well-established, in terms of neighbour relation establishment, network.

An object of embodiments herein is to provide a mechanism that improves the handling of neighbour relationships in the wireless communication network.

According to an aspect the object is achieved by providing a method performed by a second network node, such as an ANR handler node, for handling neighbour relationships between radio network nodes in a wireless communication network. The second network node initiates a neighbour relationship establishment process in the wireless communication network by transmitting an indication to a second radio network node or a first network node, such as an MRS handler node. The indication indicates or informs the second radio network node to transmit an identifier of a reference signal handler associated with a reference signal, such as an MRS, of the second radio network node along with a transmission of the reference signal, e.g., the MRS.

According to another aspect the object is achieved by providing a method performed by a first radio network node for handling neighbour relationships between radio network nodes in a wireless communication network. The first radio network node receives a measurement report from a wireless device, wherein the measurement report comprises an identity of a reference signal measured by the wireless device. The first radio network node determines that the first radio network node does not know nor recognize the identity of the reference signal in the measurement report. In that case, the first radio network node transmits a request to a second network node, which request requests for a transmission of an identifier of a reference signal handler associated with the identity of the reference signal in the measurement report.

According to yet another aspect the object is achieved by providing a method performed by a second radio network node for handling neighbour relationships between radio network nodes in a wireless communication network. The second radio network node receives, from a first or second network node, an indication indicating to transmit an identifier of a reference signal handler associated with a reference signal of the second radio network node along with a transmission of the reference signal. The second radio network node transmits an identity (ID) of a reference signal (RS) handler in direct association with one or more RS of the radio network node.

According to still another aspect the object is achieved by providing a second network node for handling neighbour relationships between radio network nodes in a wireless communication network. The second network node is configured to initiate a neighbour relationship establishment process in the wireless communication network by being configured to transmit an indication to a second radio network node or a first network node. The indication indicates the second radio network node to transmit an identifier of a reference signal handler associated with a reference signal of the second radio network node along with a transmission of the reference signal.

According to yet still another aspect the object is achieved by providing a first radio network node for handling neighbour relationships between radio network nodes in a wireless communication network. The first radio network node is configured to receive a measurement report from a wireless device, wherein the measurement report comprises an identity of a reference signal measured by the wireless device. The first radio network node is further configured to determine that the first radio network node does not know nor recognize the identity of the reference signal in the measurement report; and in that case, the first radio network node is configured to transmit a request to a second network node, which request requests for a transmission of an identifier of a reference signal handler associated with the identity of the reference signal in the measurement report.

According to another aspect the object is achieved by providing a second radio network node for handling neighbour relationships between radio network nodes in a wireless communication network. The second radio network node is configured to receive, from a first or second network node, an indication indicating to transmit an identifier of a reference signal handler associated with a reference signal of the second radio network node along with a transmission of the reference signal. The second radio network node is further configured to transmit an ID of a RS handler in direct association with one or more RS of the radio network node.

It is furthermore provided herein a computer program comprising instructions, which, when executed on at least one processor, cause the at least one processor to carry out any of the methods above, as performed by the first or second radio network node, or the second network node. It is additionally provided herein a computer-readable storage medium, having stored thereon a computer program comprising instructions which, when executed on at least one processor, cause the at least one processor to carry out the method according to any of the methods above, as performed by the first or second radio network node, or the second network node.

By transmitting the identity of the RS handler in direct association with an RS, any node in the network can identify the origin of e.g. a MRS by receiving the identity from e.g. an MRS handler node. This enables automatic neighbour relation setup in a wireless communication network supporting high gain and dynamic beamforming. The transmission of the ID of the RS handler is configured as an on-demand service that can be turned on/off by the second network node, such as an ANR handler node, in the wireless communication network. Some (as determined by the ANR handler node) or all network nodes will transmit the IDs of respective RS handler when instructed by the second network node, which can happen at the request of a particular network node or by a network-wide ANR management algorithm. This results in an efficient signalling enabling neighbour relationship setup leading to an improved performance of the wireless communication network since the first radio network node will find the second radio network node in an efficient manner.

BRIEF DESCRIPTION OF THE DRAWINGS

Embodiments will now be described in more detail in relation to the enclosed drawings, in which:

FIG. 6D is a flowchart depicting a method performed by a second radio network node according to embodiments herein;

DETAILED DESCRIPTION

Figure 1:
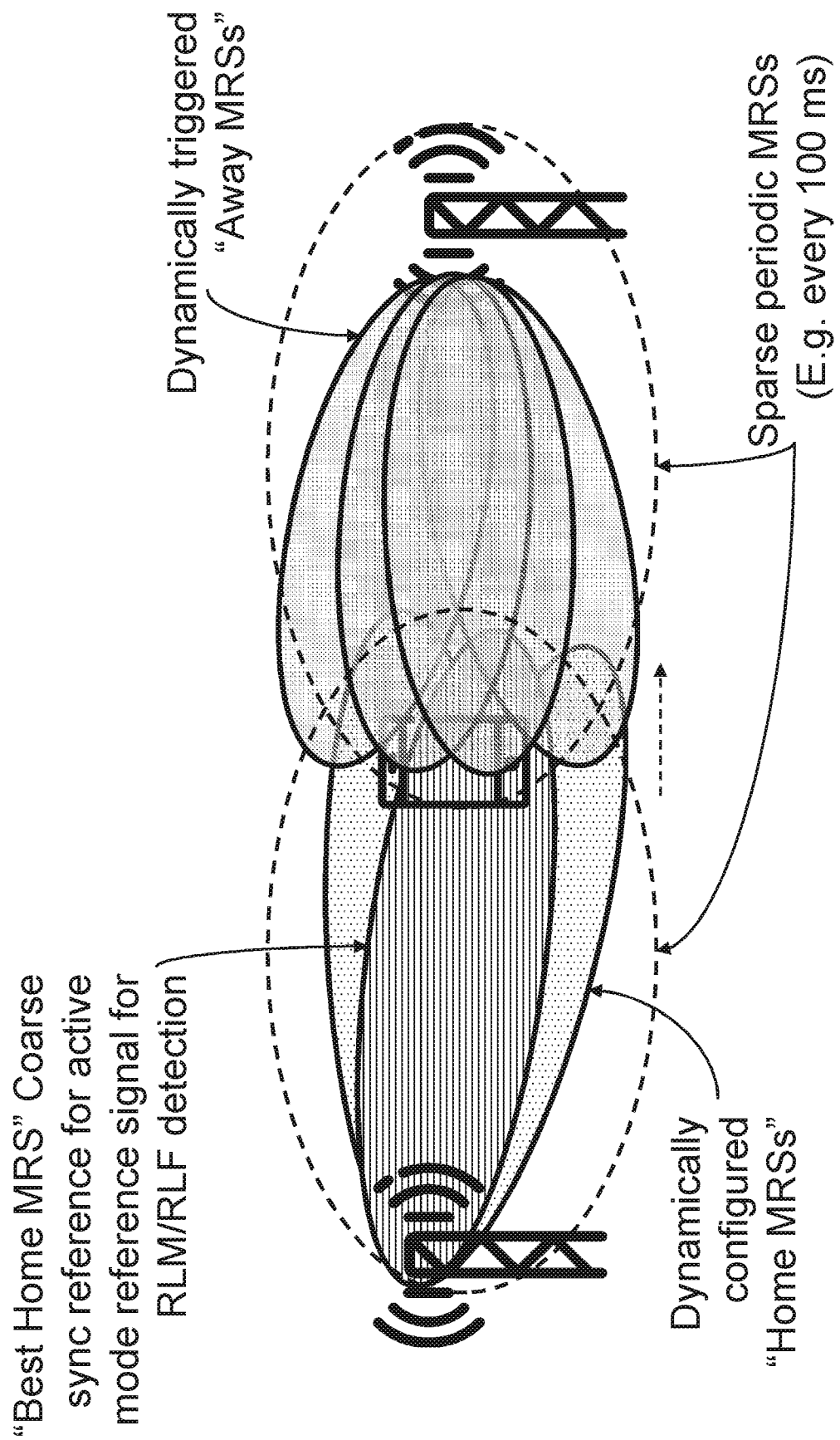
FIG. 1 shows an Overview of the downlink based active mode mobility solution proposed for 3GPP 5G New Radio (NR)
Figure 2:
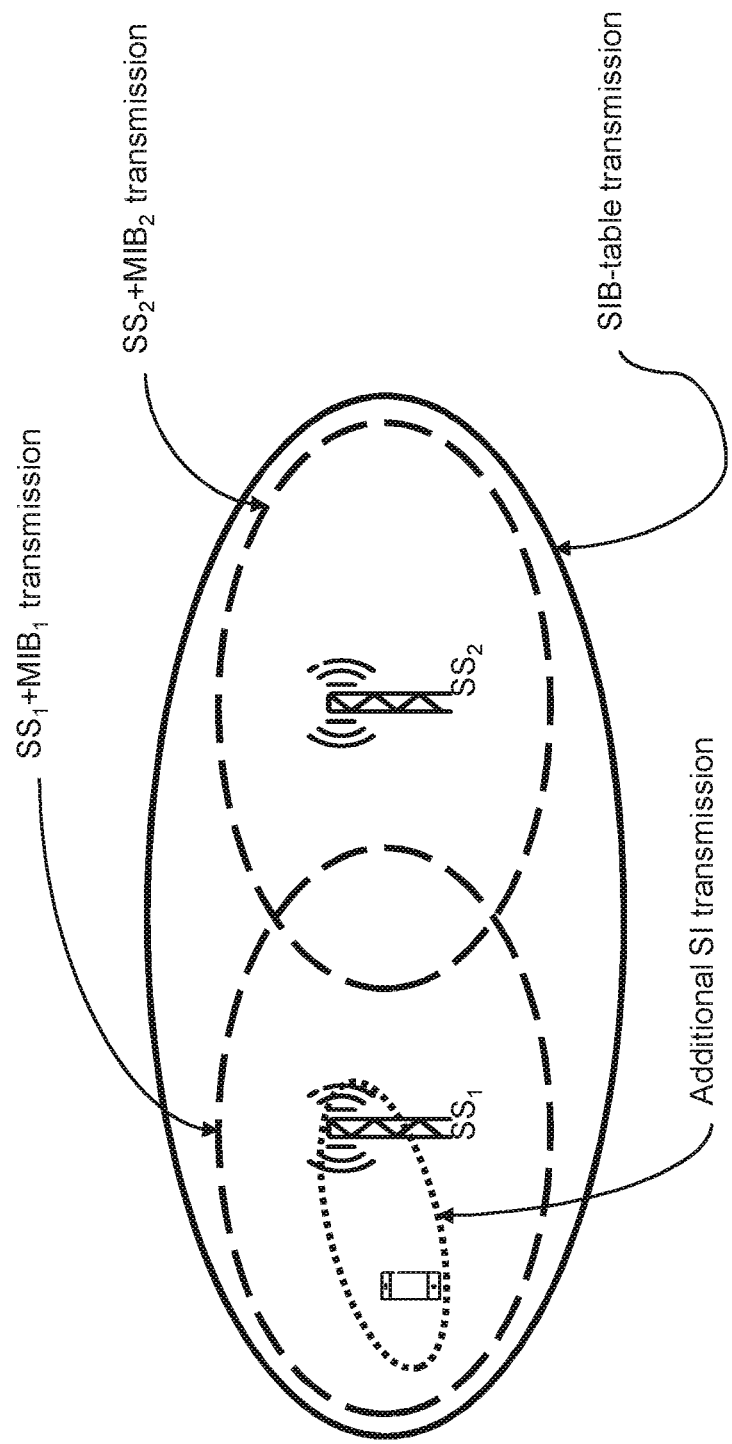
FIG. 2 shows an overview of a solution for system information acquisition in NR.
Figure 3:
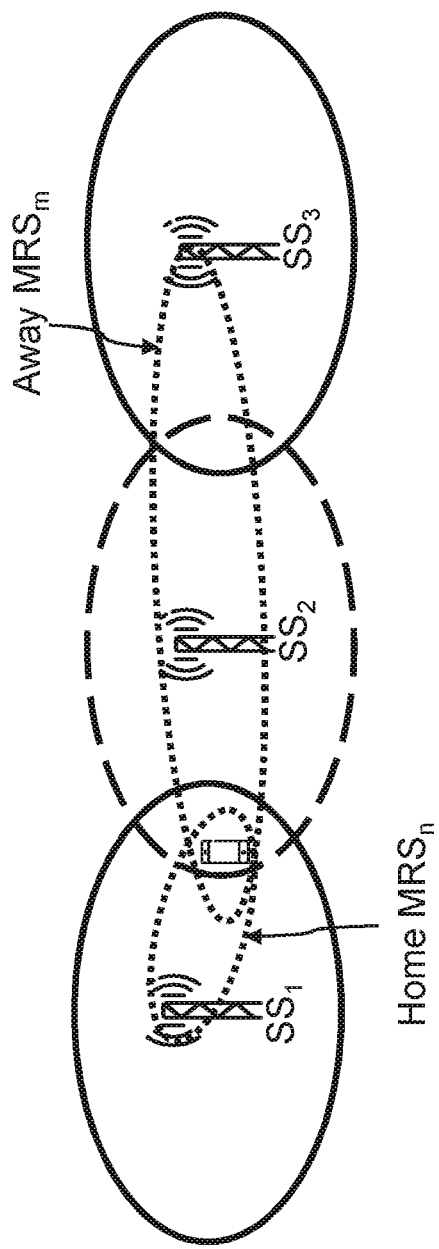
FIG. 3 shows a problem with detecting beams.
Figure 4:
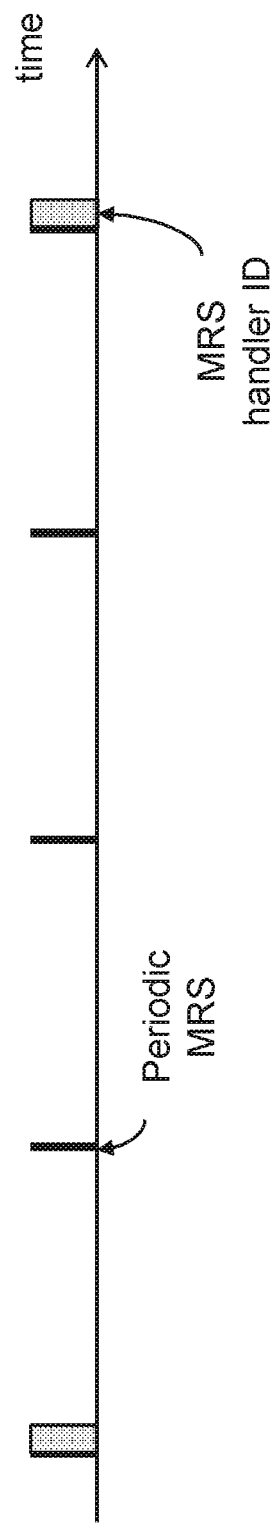
FIG. 4 is depicting how an MRS handler identity may be transmitted in association with a MRS.
Figure 5:
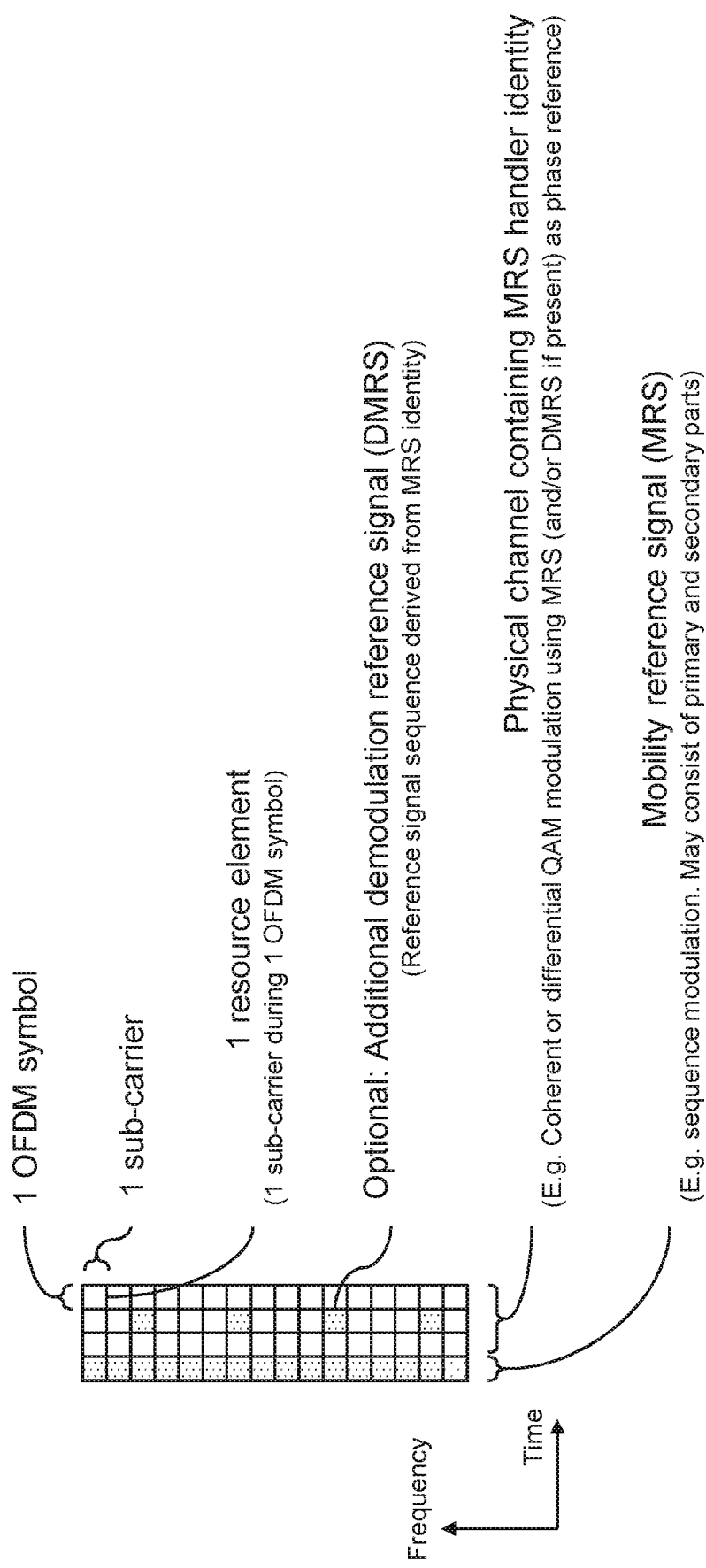
FIG. 5 is depicting a possible design of a physical channel that carries the MRS handler identity.
Figure 6A:
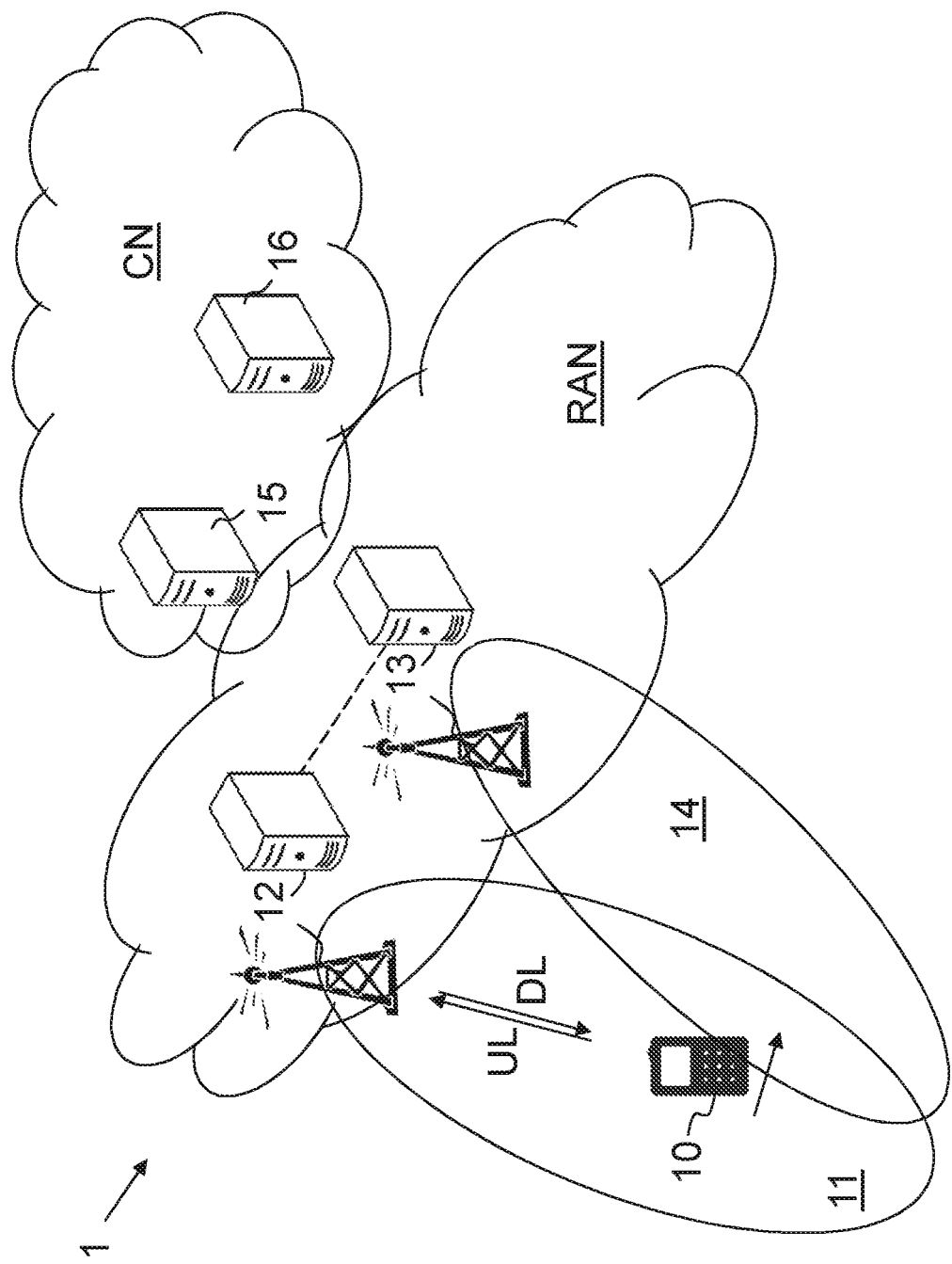
FIG. 6A is a schematic overview depicting a wireless communication network according to embodiments herein.

Embodiments herein relate to wireless communication networks in general. FIG. 6A is a schematic overview depicting a wireless communication network 1. The wireless communication network 1 comprises one or more RANs and one or more CNs. The wireless communication network 1 may use one or a number of different technologies, such as Wi-Fi, Long Term Evolution (LTE), LTE-Advanced, Fifth Generation (5G), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 1, wireless devices e.g. a wireless device such as a mobile station, a non-access point (non-AP) STA, a STA, a user equipment and/or a wireless terminal, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station capable of communicating using radio communication with a network node within an area served by the network node.

The wireless communication network 1 comprises a first radio network node 12 providing radio coverage over a geographical area, a first service area 11, of a first radio access technology (RAT), such as LTE, Wi-Fi, WiMAX or similar. The first radio network node 12 may be a transmission and reception point e.g. a radio network node such as a Wireless Local Area Network (WLAN) access point or an Access Point Station (AP STA), an access node, an access controller, a base station, e.g. a radio base station such as a NodeB, an evolved Node B (eNB, eNode B), a gNodeB (gNB), a base transceiver station, a radio remote unit, an Access Point Base Station, a base station router, a transmission arrangement of a radio base station, a stand-alone access point or any other network unit or node capable of communicating with a wireless device within the area served by the first network node 12 depending e.g. on the first radio access technology and terminology used. The first radio network node 12 may alternatively or additionally be a controller node or a packet processing node such as a radio controller node or similar. The first network node may be referred to as a serving network node wherein the first cell may be referred to as a serving cell, and the serving network node communicates with the wireless device 10 in form of DL transmissions to the wireless device 10 and UL transmissions from the wireless device 10.

The wireless communication network 1 further comprises a second radio network node 13 providing radio coverage over a geographical area, a second service area 14, of a second radio access technology (RAT), such as LTE, Wi-Fi, WiMAX or similar. The second radio network node 13 may be a transmission and reception point e.g. a radio network node such as a Wireless Local Area Network (WLAN) access point or an Access Point Station (AP STA), an access node, an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit or node capable of communicating with a wireless device within the area served by the second radio network node 13 depending e.g. on the first radio access technology and terminology used. The second radio network node 13 may alternatively or additionally be a controller node or a packet processing node such as a radio controller node or similar. The second radio network node 13 may be referred to as a neighbouring network node wherein the second service area may be referred to as a neighbouring cell, and the second radio network node communicates with the wireless device 10 in form of DL transmissions to the wireless device 10 and UL transmissions from the wireless device 10.

It should be noted that a service area may be denoted as cell, beam, beam group or similar to define an area of radio coverage. The first and second RAT may be the same RAT.

The wireless communication network node 1 further comprises a first network node 15, also referred to as an MRS handler node, may be any RAN node e.g. the second radio network node 13 or core network node such as a Mobility Managing Entity, an Operation and Maintenance node, Access and Mobility Management Function (AMF) pool or similar. The wireless communication network node 1 further comprises a second network node 16, also referred to as an ANR handler node or entity, which may be any core network node such as a Mobility Managing Entity (MME), an Operation and Maintenance node, AMF pool or similar. Hence, the MRS and/or ANR handler node is a network node, such as a core network node, O&M node, or a RAN node, that knows which radio network node that is transmitting the RS and it can e.g. provide the IP-address or Transport Network Layer (TNL) address of that radio network node. The RS handler node may in fact be the same network node that transmits the RS, i.e. the second radio network node, the second radio network node may then provide the IP address to itself. The first and second network node may in fact be the same network node and may in some embodiments actually be a part of a radio network node such as the second radio network node 13. An ANR handler node is a logical entity that controls whether a radio network node needs to transmit a unique identifier along with the reference signal or not. An MRS handler node is a logical entity that maintains the mapping between the radio network nodes and the reference signals transmitted by the said radio network nodes. The MRS handler node need not be the same as the ANR handler node. The MRS handler node is most likely located in RAN and the ANR handler node is likely to be located in the core network such as an AMF pool.

The radio network nodes transmit RSs, such as MRSs, over respective service area. Hence, the first and second radio network nodes transmit reference signals for mobility purposes of wireless devices, such as MRS or beam reference signals (BRS), repeatedly, in time, in a large number of different directions using as many Tx-beams as deemed necessary to cover an operational area of the respective radio network node. Hence the first radio network node 12 provides radio coverage over the first service area using a first reference signal, e.g. first MRS, for identifying the first service area 11 in the wireless communication network. The second radio network node 13 provides radio coverage over the second service area 14 using a second reference signal, e.g. second MRS, for identifying the second service area 14 in the wireless communication network. These reference signals, first and second MRS, may be initiated upon request from a radio network node, e.g. a neighbouring radio network node, or configured to be sent continuously.

According to embodiments herein the second network node 16 initiates the transmission of an identity of an RS handler e.g. a first network node ID, along with the RS of the second radio network node 13. The transmission of the ID of the RS handler may thus be configured as an on-demand service that can be turned on/off by the second network node 16 in the network. Some (as determined by e.g. the ANR handler entity) or all radio network nodes will transmit the IDs of respective RS handler when instructed by the second network node 16 such as the ANR handler node, which can happen at the request of a particular network node or a network-wide ANR management algorithm. The ANR handler ID, i.e. identity of the second network node 16, may also be transmitted.

In an established (in terms of neighbour relations) network, the transmission of the ID of the RS handler can be in the off-state most of the time to reduce the overhead of transmitting the ID of the RS handler in each of the RS beams, which improves the traffic capacity of the network. In some cases the ID of the RS handler may be the Cell Global Identity of the cell and in some other cases it may be the identity of the MME/AMFPool etc.

Note that in a general scenario the term "radio network node" can be substituted with "transmission point". The key observation is that it must be possible to make a distinction between the transmission points (TPs), typically based on MRSs or different synchronization signals and BRSs transmitted. Several TPs may be logically connected to the same radio network node but if they are geographically separated, or are pointing in different propagation directions, the TPs will be subject to the same mobility issues as different radio network nodes. In subsequent sections, the terms "radio network node" and "TP" can be thought of as interchangeable.

Figure 6B:
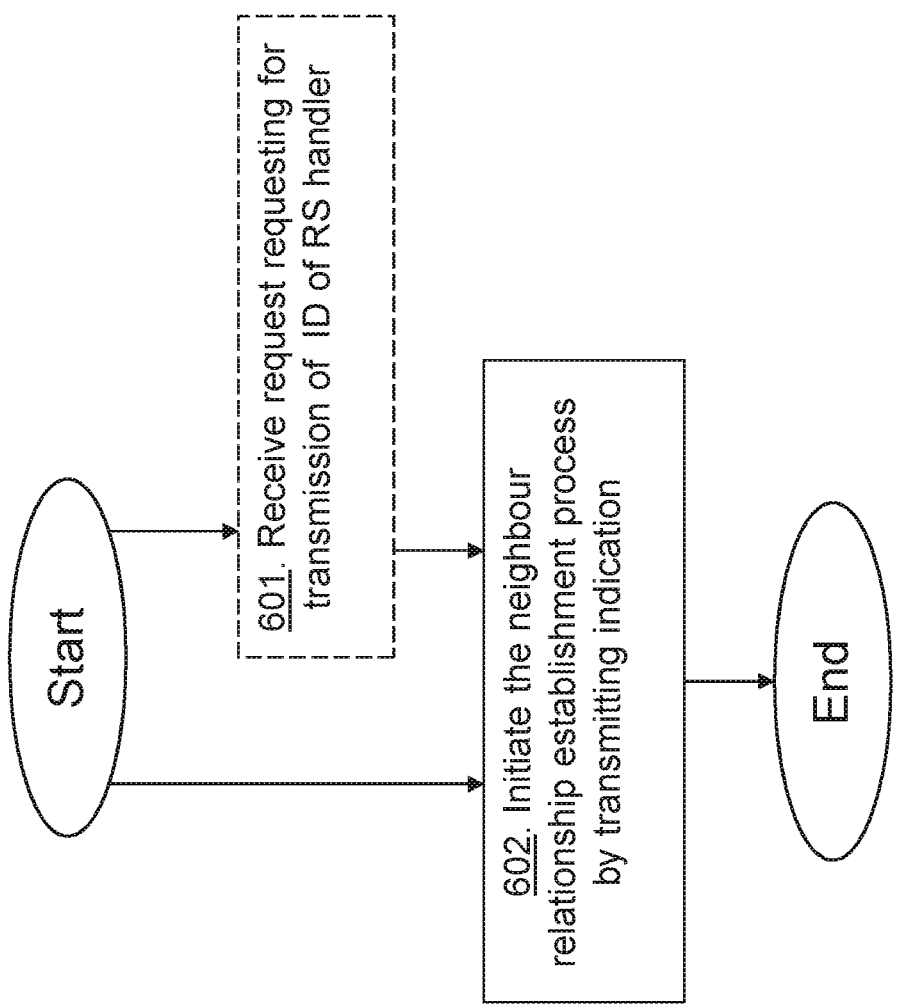
FIG. 6B is a flowchart depicting a method performed by a second network node according to embodiments herein.

The method actions performed by the second network node 16 for handling neighbour relationship between the radio network nodes in the wireless communication network 1 according to some embodiments will now be described with reference to a flowchart depicted in FIG. 6B. Actions performed in some embodiments are marked with dashed boxes.

Action 601. The second network node 16 may receive a request, from the first radio network node 12, requesting for a transmission of the identity of the reference signal handler. The request may be an ANR feature activation request from the first radio network node 12. This reception of the request may then trigger action 602.

Action 602. The second network node 16 initiates the neighbour relationship establishment process in the wireless communication network by transmitting the indication to the second radio network node 13 or the first network node 15. The indication indicates the second radio network node 13 to transmit the identifier of the reference signal handler associated with the reference signal of the second radio network node 13 along with the transmission of the reference signal. For example, the indication may be one bit or a value indicating start of transmission of ID of the RS handler. The indication may be a message such as a MRS handler ID transmission activation message or an ANR feature activation. It should be noted that the indication may be transmitted to one or more radio network nodes or network nodes. The initiation may be triggered by receiving the request in action 601 or it may be triggered by the second network node 16, i.e. internally see e.g. action 200 below. The indication may be transmitted to a subset of the radio network nodes in an area. For example, the request requesting for the transmission of ID of RS handler may comprise the identity of the unknown MRSs that have been reported by the wireless device to the first radio network node 12 in a message. Using this information, the second network node 16 may choose a subset of radio network nodes to participate in the transmission of ID of RS handler.

In some embodiments herein a method performed by a network node such as the first and/or second network node is provided for handling neighbour relationships in a wireless communication network. The network node initiates an ANR process in the wireless communication network by transmitting an indication to a second radio network node indicating to transmit an identifier of a reference signal handler associated with a reference signal of the second radio network node along with a transmission of the reference signal. This may be triggered by receiving a request requesting for the ID of the RS handler.

Figure 6C:
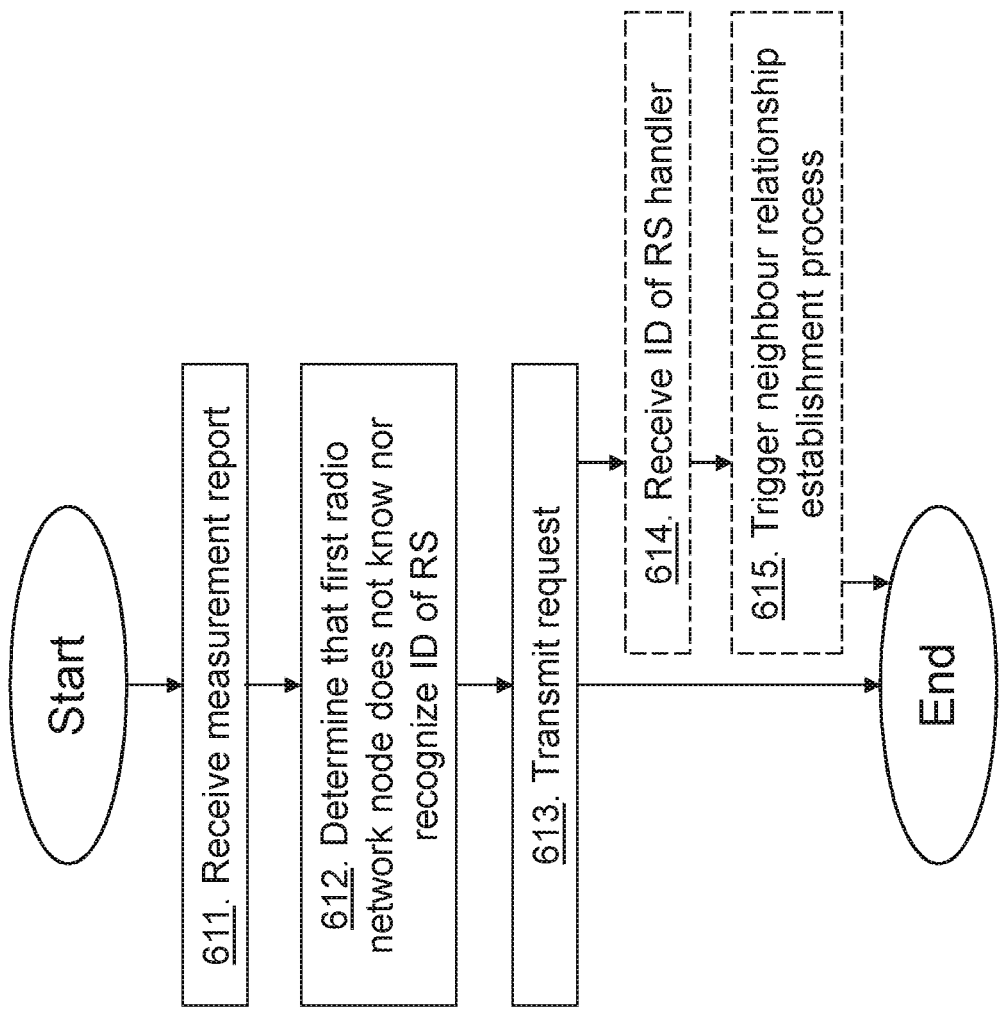
FIG. 6C is a flowchart depicting a method performed by a first radio network node according to embodiments herein.

The method actions performed by the first radio network node 12 for handling neighbour relationship between the radio network nodes in the wireless communication network 1 according to some embodiments will now be described with reference to a flowchart depicted in FIG. 6C. The actions do not have to be taken in the order stated below, but may be taken in any suitable order.

Action 611. The first radio network node 12 receives a measurement report from the wireless device 10, wherein the measurement report comprises an identity of a reference signal measured by the wireless device.

Action 612. The first radio network node 12 then determines that the first radio network node 12 does not know nor recognize the identity of the reference signal in the measurement report. E.g. the first radio network node 12 does not have previously a neighbour relationship such as an ANR to the second radio network node. The first radio network node has more than one radio network node in its neighbour relation table that transmit the same identity, e.g. similar Physical cell identity (PCI) confusion.

Action 613. In that case the first radio network node 12 transmits the request, also referred to as the ANR feature activation request, to the second network node 16, which request requests the transmission of the identifier of the reference signal handler associated with the identity of the reference signal in the measurement report. The first radio network node 12 may be preconfigured or know who is the 'ANR handler' for this service area.

Action 614. The first radio network node 12 may then receive from the wireless device 10 the ID of the RS handler.

Action 615. The first radio network node 12 may further trigger a neighbour relationship establishment process to a second radio network node 13 based on the received ID of the RS handler.

The first radio network node 12 may thus trigger transmission of the ID of the RS handler and then the wireless device 10 may transmit to the first radio network node 12 the report indicating the identity of the MRS handler associated with the RS identity of the one or more MRS transmissions. Thus, the first radio network node 12 may receive a response from the wireless device which response comprises the identity of the RS Handler (see action 212).

The first radio network node may then locate or find, from the ID of the RS handler, the first network node 15 and transmits to the first network node 15 a MRS source information request. The MRS source information request requests information regarding the second radio network node 13 transmitting the MRS in the measurement report (see action 213).

The first network node 15 may then respond with location information e.g. IP address of the second radio network node 13 (see action 214). The first radio network node 12 may then transmit an ANR setup request to the second radio network node 13, and the second radio network node 13 may transmit an ANR setup response e.g. confirming the setup of the connection and neighbour relationship (see actions 215-216).

The method actions performed by the second radio network node 13 for handling neighbour relationship between the radio network nodes in the wireless communication network 1 according to some embodiments will now be described with reference to a flowchart depicted in FIG. 6D.

Action 621. The second radio network node 13 receives from the first or second network node, the indication indicating to transmit the identifier of the reference signal handler, e.g. the first network node ID, associated with the reference signal of the second radio network node 13 along with the transmission of the reference signal. The indication may be the MRS handler ID transmission activation or a request from the second network node 16 directly.

Action 622. The second radio network node 13 then transmits the ID of the RS, handler in direct association with one or more RS of the radio network node. That the ID of the RS Handler is transmitted in direct association with the one or more RS may be performed by one or more of the following: an identity of an RS is used as a demodulation reference signal (DMRS) for a physical channel that contains the ID of the RS handler; the identity of the RS is used to derive a scrambling code required for receiving a physical channel that contains the ID of the RS handler; the RS provides a time and frequency reference for a physical channel that contains the ID of the RS handler; and the RS is used directly as a demodulation reference signal (DMRS) for a physical channel that contains the ID of the RS handler.

Upon this triggering of ID transmission of RS handler the first radio network node 12 may then transmits an ANR setup request to the second radio network node 13 (see action 215). The second radio network node 13 may then transmit an ANR setup response e.g. confirming the setup of the connection and neighbour relationship (see action 216).

In some embodiments a method performed by the second radio network node is provided for handling neighbour relationships in a wireless communication network. The second radio network node receives an indication indicating to transmit an identifier of a reference signal handler associated with a reference signal of the second radio network node along with a transmission of the reference signal. The second radio network node then transmit the identity (ID) of the reference signal (RS) handler in direct association with one or more MRS of the radio network node. That the ID of the RS Handler, e.g. MRS handler ID, is transmitted in direct association with the one or more MRS may be performed by one or more of the following: an identity of an MRS is used as a demodulation reference signal (DMRS) for a physical channel that contains the ID of the MRS handler; the identity of the MRS is used to derive a scrambling code required for receiving a physical channel that contains the ID of the MRS handler; the MRS provides a time and frequency reference for a physical channel that contains the ID of the MRS handler; and the MRS is used directly as a demodulation reference signal (DMRS) for a physical channel that contains the ID of the MRS handler. The ID of the RS handler may be e.g. a Base station global identity, a cell global identity (CGI), a gNB identity, an eNB identity, a centralized RAN (CRAN)-identity, a Radio network controller ID, an operation and support system (OSS) address, Mobility management entity (MME) ID, or an identity of any other network node in the wireless communication network responsible for knowing the meaning of the MRS identity. The MRS handler is a network node, such as a core network node, O&M node, or a RAN node, that knows which radio network node that is transmitting the MRS and it can e.g. provide the IP-address of that radio network node. The MRS handler may in fact be the same network node that transmits the MRS, i.e. the second radio network node, the second radio network node may then provide the IP address to itself. The second radio network node may obtain a configuration of the identity of the MRS handler from the MRS handler. The second radio network node may associate the identity of the MRS handler with the one or more MRSs.

Figure 7:
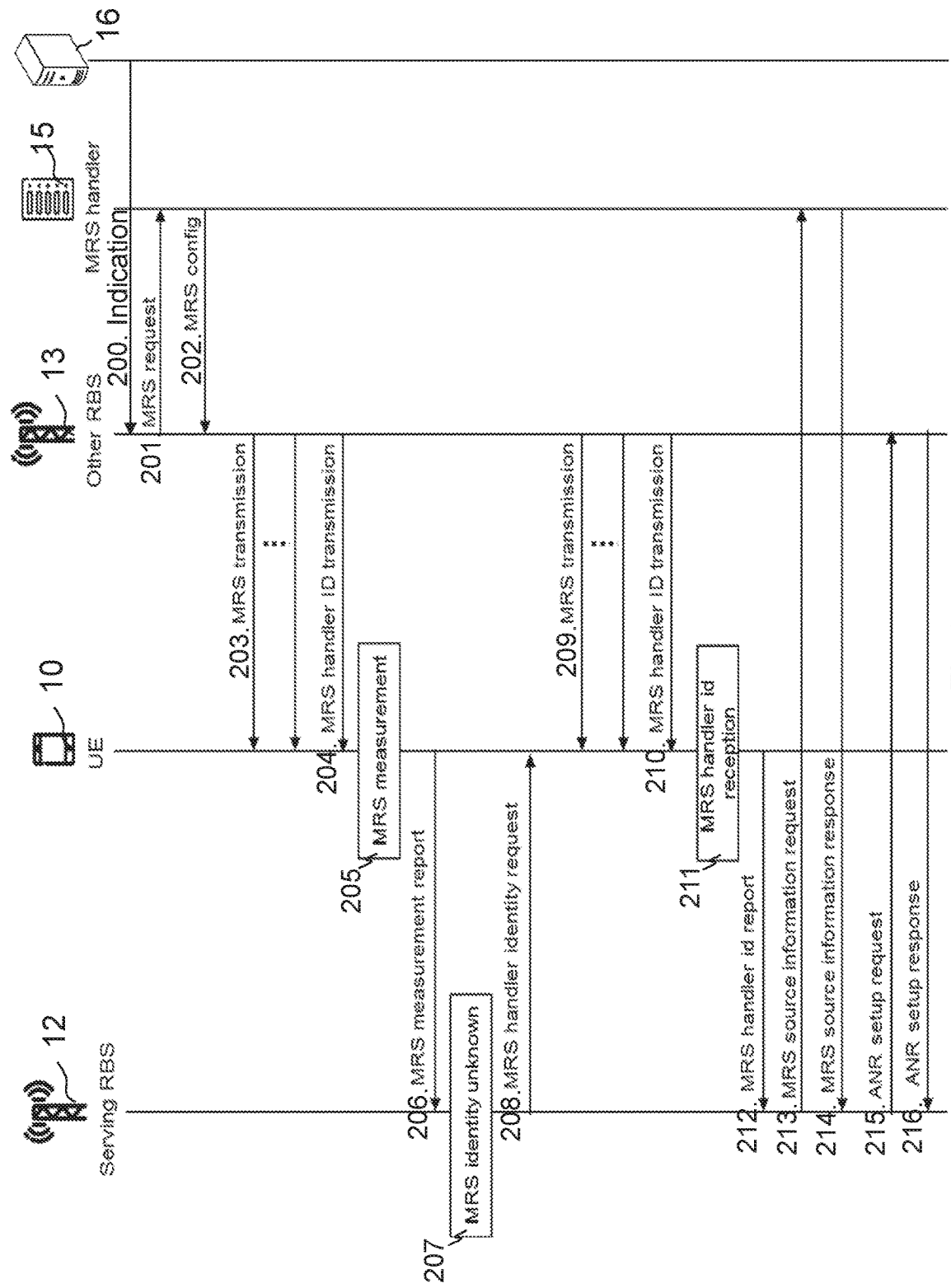
FIG. 7 is a combined signalling scheme and flowchart according to embodiments herein.

FIG. 7 is a combined flowchart and signalling scheme according to embodiments herein. FIG. 7 shows an example depicting a procedure utilizing the transmission, from a non-serving node, the identity of the RS handler, exemplified herein as an MRS handler, and the associated reporting of said identity of the RS handler by the wireless device 10 that enables an automatic neighbour relation establishment. The actions may be performed in any suitable order. The reference signal is exemplified as an MRS in this example.

Action 200. The second network node 16 initiates the neighbour relationship process by sending an indication to the first network node 15 or directly to the second radio network node 13 indicating to transmit an identifier of a reference signal handler associated with a reference signal of the second radio network node 13 along with a transmission of the reference signal. For example, the indication may be a flag bit (on/off) indicating transmission of the ID of the first network node 15 being responsible of the MRS of the second radio network node 13 along with the second MRS of the second radio network node 13. This indication may be transmitted upon request (see FIG. 8), initially, when being configured, or similar.

Action 201. The second radio network node 13 transmits a MRS request to the first network node 15, such as the MRS Handler node. This may be triggered by receiving the indication from the second network node 16.

Action 202. The first network node 15 transmits an ID configuration of the MRS handler to the second radio network node 13 requesting the information.

Action 203. The second radio network node 13 then transmits, to one or more wireless devices e.g. broadcasts, one or more MRS transmissions over the second service area 14. The MRS transmissions may further carry an MRS identity.

Action 204. According to embodiments herein the second radio network node 13 transmits, to the wireless device 10, the identity of the MRS handler in a MRS handler ID transmission in direct association with the transmitted one or more MRSs as initiated by the second network node 16. For example, the second radio network node 13 may broadcast the MRS ID along with the identity of the MRS handler.

Action 205. The wireless device 10 then measures signal strength or quality of the one or more MRS.

Action 206. The wireless device 10 then transmits, to the first radio network node 12, a measurement report that may be denoted MRS measurement report. The measurement report indicates the measured signal strength of the one or more MRSs and the MRS identity of the one or more MRSs, which MRS identities are locally unique identities, e.g. short identities e.g. 3 bits for efficient signalling.

Action 207. The first radio network node 12 receives the measurement report and determines that the first radio network node 12 does not know nor recognize the MRS identity of the measurement report.

Action 208. The first radio network node 12 then transmits request also referred to as a MRS handler ID request to the wireless device 10. The request requests the identity of an MRS handler associated with the MRS identity.

Action 209. The second radio network node 13 transmits the one or more MRS transmissions to the wireless device 10.

Action 210. The second radio network node 13 further transmits the MRS handler ID in direct association with the MRS transmissions.

Action 211. Thus, the wireless device 10 further receives and detects the MRS identity in a MRS transmission, which MRS ID is requested by the first radio network node 12 in action 208. Furthermore, the wireless device 10 decodes and retrieves the ID of the MRS handler in direct association with the MRS transmission.

Action 212. The wireless device 10 transmits to the first radio network node a MRS handler ID report indicating the identity of the MRS handler associated with the MRS identity of the one or more MRS transmissions. Thus, the first radio network node 12 receives a response from the wireless device which response comprises the identity of the MRS Handler.

Action 213. The first radio network node locates or finds, from the MRS handler ID, the network node 15 and transmits to the network node 15 a MRS source information request. The MRS source information request requests information regarding the second radio network node 13 transmitting the MRS in the measurement report.

Action 214. The network node 15 responds with location information e.g. IP address of the second radio network node 13.

Action 215. The first radio network node 12 then transmits an ANR setup request to the second radio network node 13.

Action 216. The second radio network node 13 may then transmit an ANR setup response e.g. confirming the setup of the connection and neighbour relationship.

In FIG. 7 it is depicted the operation of the ANR algorithm in accordance with some embodiments herein. In this example the transmission of the identity of the first network node 15 is triggered by the second network node 16 in action 200. The wireless device 10 may read and report the identity of the first network node 15 upon request and report to the serving radio network node 12. The serving radio network node 12 handles the ANR setup after that.

Figure 8:
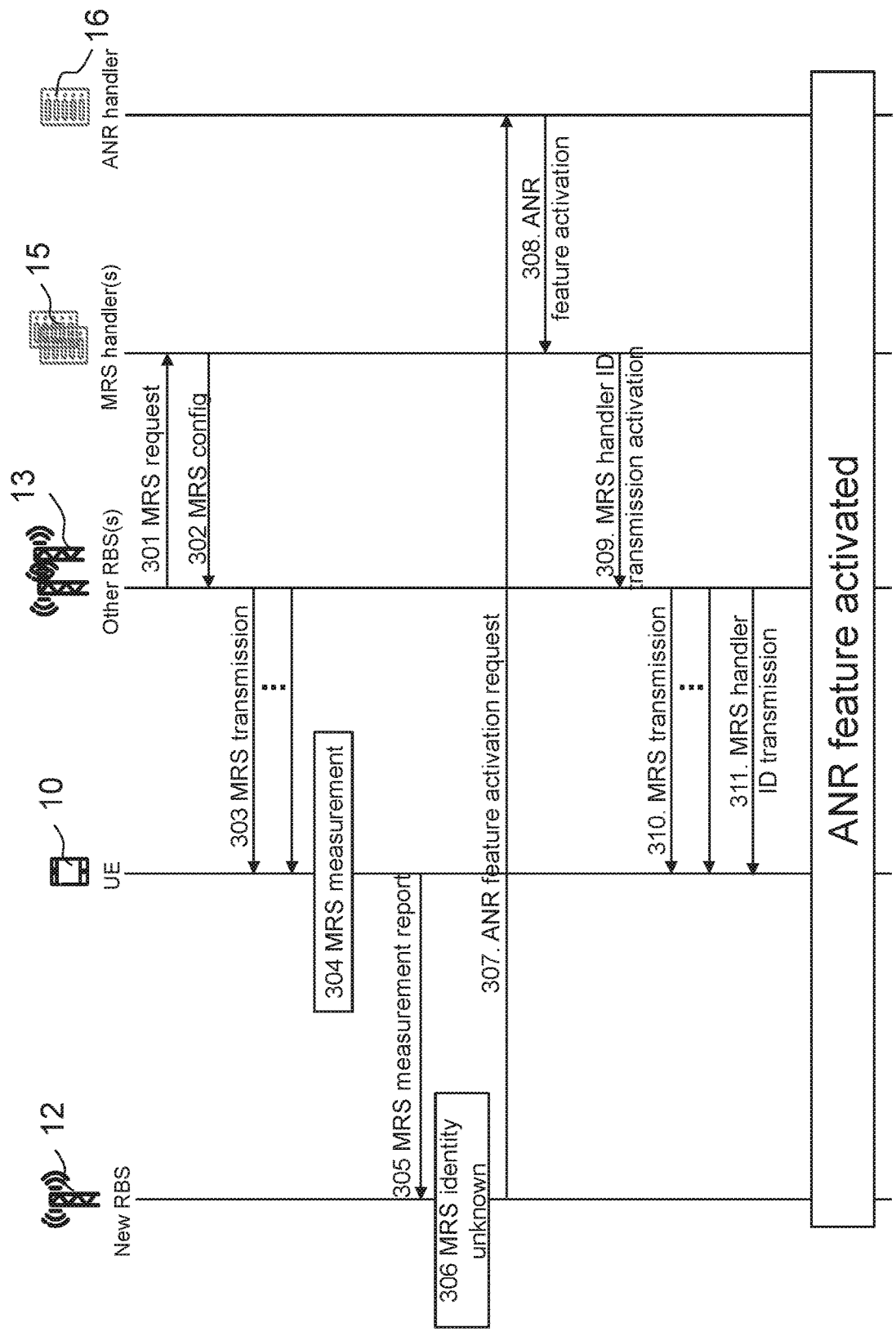
FIG. 8 is a combined signalling scheme and flowchart according to embodiments herein.

FIG. 8 is a combined flowchart and signalling scheme according to some embodiments herein. The reference signal is exemplified as an MRS in this example, and the actions may be performed in any suitable order.

Action 301. The second radio network node 13 may transmit a MRS request to the first network node 15, such as the MRD Handler.

Action 302. The first network node 15 may then transmit an ID configuration of the MRS handler to the second radio network node 13 requesting the information.

Action 303. The second radio network node 13 may then transmit, to the wireless device 10, one or more MRS transmissions over the second service area 14. The MRS transmissions may further carry an MRS identity.

Action 304. The wireless device 10 may then measure signal strength or quality of the one or more MRS, also referred to as MRS measurements.

Action 305. The wireless device 10 may then transmit, to the first radio network node 12, a measurement report that may be denoted MRS measurement report. The measurement report indicates the measured signal strength of the one or more MRSs and the MRS identity of the one or more MRSs. The MRS identities may be locally unique identities, e.g. short identities e.g. 3 bits for efficient signalling.

Action 306. The first radio network node 12 then receives the measurement report and determines that the first radio network node 12 does not know nor recognize the MRS identity of the measurement report.

Action 307. According to some embodiments herein the first radio network node 12 may then transmit a request, also referred to as an ANR feature activation request, to the second network node 16. The request requests for the transmission of the identity of an MRS handler associated with the MRS identity. For example, the request may request for the ANR feature to be activated. This is in turn may be interpreted by the second network node as to request the RS handlers to request their respective radio network node to start transmitting ID of the respective RS handler along with RSs.

Action 308. The second network node 16 may thus receive the request and transmit the indication, e.g. an ANR feature activation, to the first network node 15.

Action 309. The first network node 15 may then transmit a MRS handler ID activation request to the second radio network node 13.

Action 310. The second radio network node 13 transmits the one or more MRS transmissions to the wireless device 10.

Action 311. The second radio network node 13 further transmits the MRS handler ID in direct association with the MRS transmissions.

Thus, the wireless device 10 further receives and detects the MRS identity in a MRS transmission, which MRS ID may be requested by the first radio network node and furthermore, the wireless device 10 decodes and retrieves the ID of the MRS handler in direct association with the MRS transmission. From this the first radio network node 12 can initiate an ANR setup process. Thus, the serving radio network node 12 handles the ANR setup after that.

The ID of the MRS handler is only transmitted upon request of a network entity such as the first network node or the second network node 16 referred to as ANR handler as shown in FIG. 8. In one embodiment, the ANR handler could request only a subset of the radio network nodes in the area to transmit MRS handler IDs. In another embodiment, the transmission of MRS handler IDs could be requested to all network nodes in the requested area.

In one embodiment, the second network node 16 may request the radio network nodes to transmit MRS handler IDs upon receiving a request to do so from a new/existing radio network nodes that has detected some anomaly in its neighbour relations. This embodiment is shown in FIG. 8, wherein the new RBS, i.e. the first radio network node 12, requests the second network node 16 for the transmission of IDs of respective MRS handler.

In another embodiment, the second network node 16 may voluntarily request the radio network nodes to transmit the IDs of the RS handler (for e.g., during low traffic situation) to enable the verification of existing neighbour relations and to create relations for any new neighbours that might have come up in the area.

Embodiments herein provide methods to have the ANR as a service controlled by an ANR handler which turns on/off the ANR when it is necessary to support ANR functions in particular nodes or the network as whole as shown in FIGS. 7 and 8.

Figure 9:
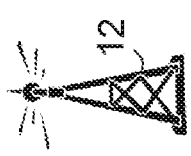
FIG. 9 is a block diagram depicting a second network node according to embodiments herein.
Figure 9:
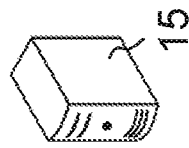
Figure 9:
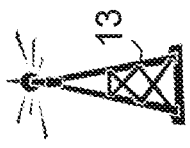
Figure 9:
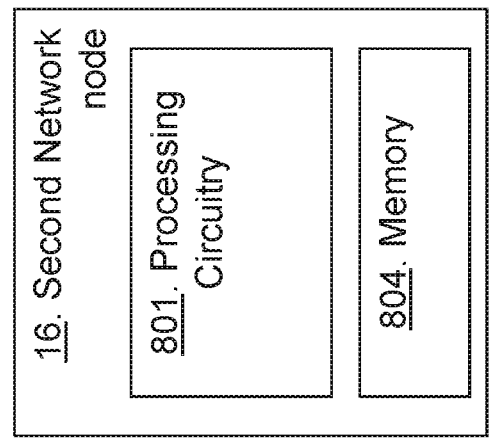
Figure 9:
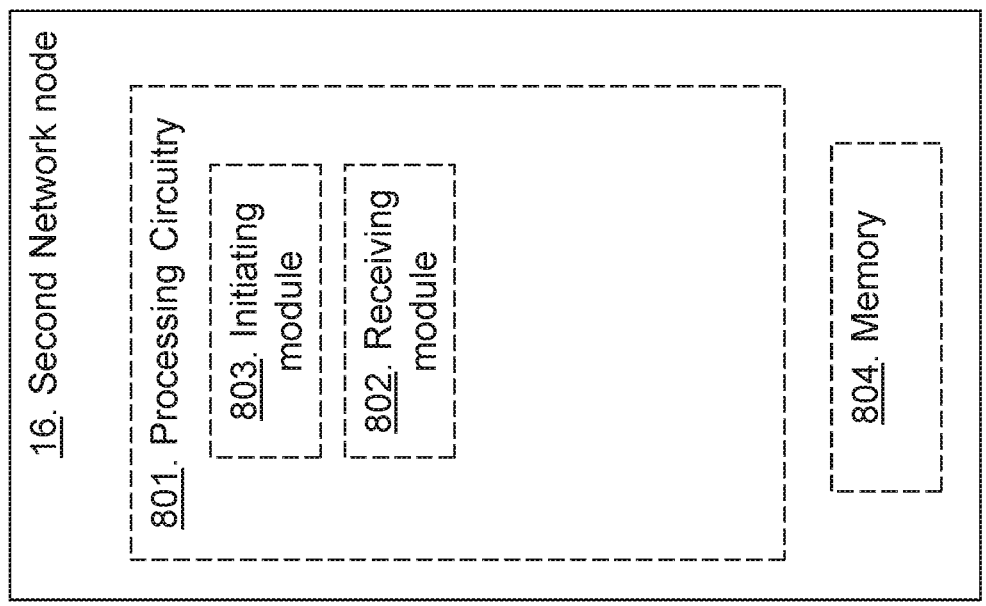
Figure 9:
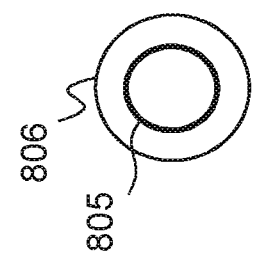

FIG. 9 is a block diagram depicting the second network node 16 for handling neighbour relationships between radio network nodes in the wireless communication network 1 according to embodiments herein.

The second network node 16 may comprise a processing circuitry 801, e.g. one or more processors, configured to perform the methods herein.

The second network node 16 may comprise a receiving module 802, e.g. a receiver or a transceiver. The second network node 16, the processing circuitry 801, and/or the receiving module 802 may be configured to receive the request from the first radio network node 12 or another network node to initiate activation of transmission of ID of the RS handler such as the first network node ID, along the MRS of the second radio network node 13. The second network node 16, the processing circuitry 801, and/or the receiving module 802 may be configured to trigger the initiation of the neighbour relationship process by being configured to receive the request, from the first radio network node 12, requesting for the transmission of the identity of the reference signal handler.

The second network node 16 may comprise an initiating module 803. The second network node 16, the processing circuitry 801, and/or the initiating module 803 is configured to initiate the neighbour relationship establishment process in the wireless communication network by being configured to transmit the indication to the second radio network node 13 or the first network node 15. The indication indicates or informs the second radio network node 13 to transmit the identifier of the reference signal handler associated with the reference signal of the second radio network node 13 along with the transmission of the reference signal. For example, the second network node 16, the processing circuitry 801, and/or the initiating module 803 may be configured to perform the activation of initiating transmission of identity of the first network node 15 from the second radio network node 13, e.g. being configured to transmit the indication to the first network node 15 or the second radio network node 13 indicating activation of the transmission of the identity of the first network node 15 along with the MRS of the second radio network node 13. The second network node 16, the processing circuitry 801, and/or the initiating module 803 may be configured to trigger the initiation of the neighbour relationship process by itself. The second network node 16, the processing circuitry 801, and/or the initiating module 803 may be configured to transmit the indication to the subset of the radio network nodes in the area.

The second network node 16 further comprises a memory 804. The memory comprises one or more units to be used to store data on, such as MRSs, strengths or qualities, indications, requests, commands, applications to perform the methods disclosed herein when being executed, and similar.

The methods according to the embodiments described herein for the second network node 16 are respectively implemented by means of e.g. a computer program 805 or a computer program product, comprising instructions, i.e., software code portions, which, when executed on at least one processor, cause the at least one processor to carry out the actions described herein, as performed by the second network node 16. The computer program 805 may be stored on a computer-readable storage medium 806, e.g. a disc or similar. The computer-readable storage medium 806, having stored thereon the computer program, may comprise the instructions which, when executed on at least one processor, cause the at least one processor to carry out the actions described herein, as performed by the second network node 16. In some embodiments, the computer-readable storage medium may be a non-transitory computer-readable storage medium.

Figure 10:
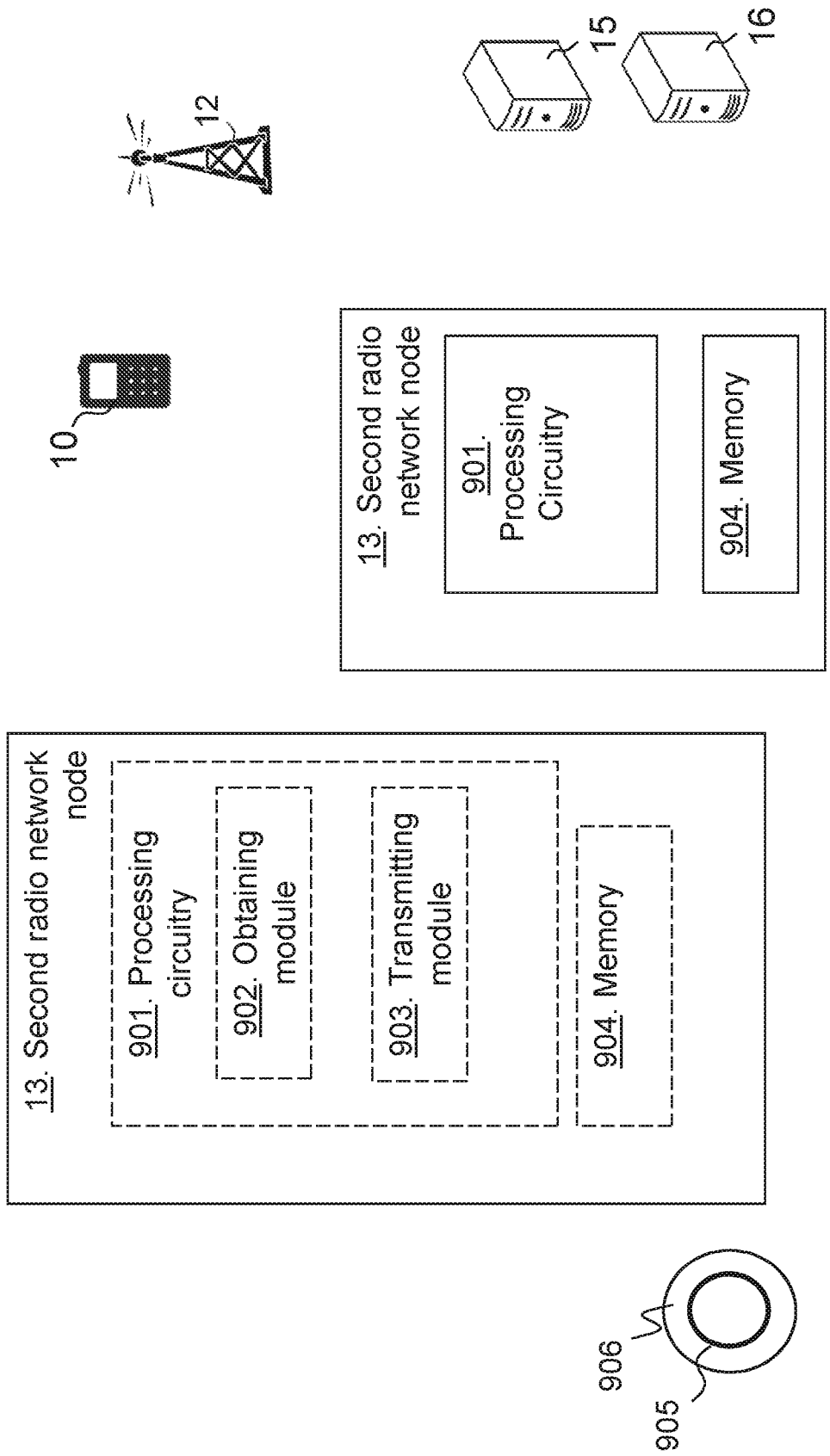
FIG. 10 is a block diagram depicting a second radio network node according to embodiments herein.

FIG. 10 is a block diagram depicting the second radio network node 13 for handling neighbour relationships between radio network nodes in a wireless communication network.

The second radio network node 13 may comprise a processing circuitry 901, e.g. one or more processors, configured to perform the methods herein.

The second radio network node 13 may comprise an obtaining module 902, e.g. a receiver or a transceiver. The second radio network node 13, the processing circuitry 901, and/or the obtaining module 902 is configured to receive, from the first or second network node, the indication indicating to transmit the identifier of the reference signal handler associated with the reference signal of the second radio network node 13 along with the transmission of the reference signal.

The second radio network node 13 may comprise a transmitting module 903, e.g. a transmitter or a transceiver. The second radio network node 13, the processing circuitry 901, and/or the transmitting module 903 is configured to transmit the ID of the RS handler in direct association with one or more RS of the radio network node.

In some embodiments the second radio network node 13/first network node 15 may be configured to provide radio coverage over the second service area 14 using the second reference signal for identifying the second service area 14 in the wireless communication network. The wireless device 10 may be served by the first radio network node 12 providing radio coverage over the first service area 11 using the first reference signal for identifying the first service area in the wireless communication network 1. The second radio network node 13/first network node 15 may e.g. comprise a processing unit, e.g. one or more processors, configured to perform the methods herein.

The second radio network node 13/first network node 15 may comprise an obtaining module, e.g. a receiver or a transceiver. The second radio network node 13/first network node 15, the processing unit, and/or the obtaining module may be configured to receive the indication from the second network node 16.

The second radio network node 13 may comprise a transmitting module, e.g. a transmitter or a transceiver. The second radio network node 13/first network node 15, the processing unit, and/or the transmitting module may be configured to transmit the ID of the RS handler 15 in direct association with one or more MRS of the radio network node, or an activation of the transmission of the ID of the first network node 15.

The second radio network node 13 and/or the first network node 15 further comprise a memory 904. The memory comprises one or more units to be used to store data on, such as MRSs, strengths or qualities, ID of the first network node 15 i.e. the RS handler, applications to perform the methods disclosed herein when being executed, and similar.

Figure 11:
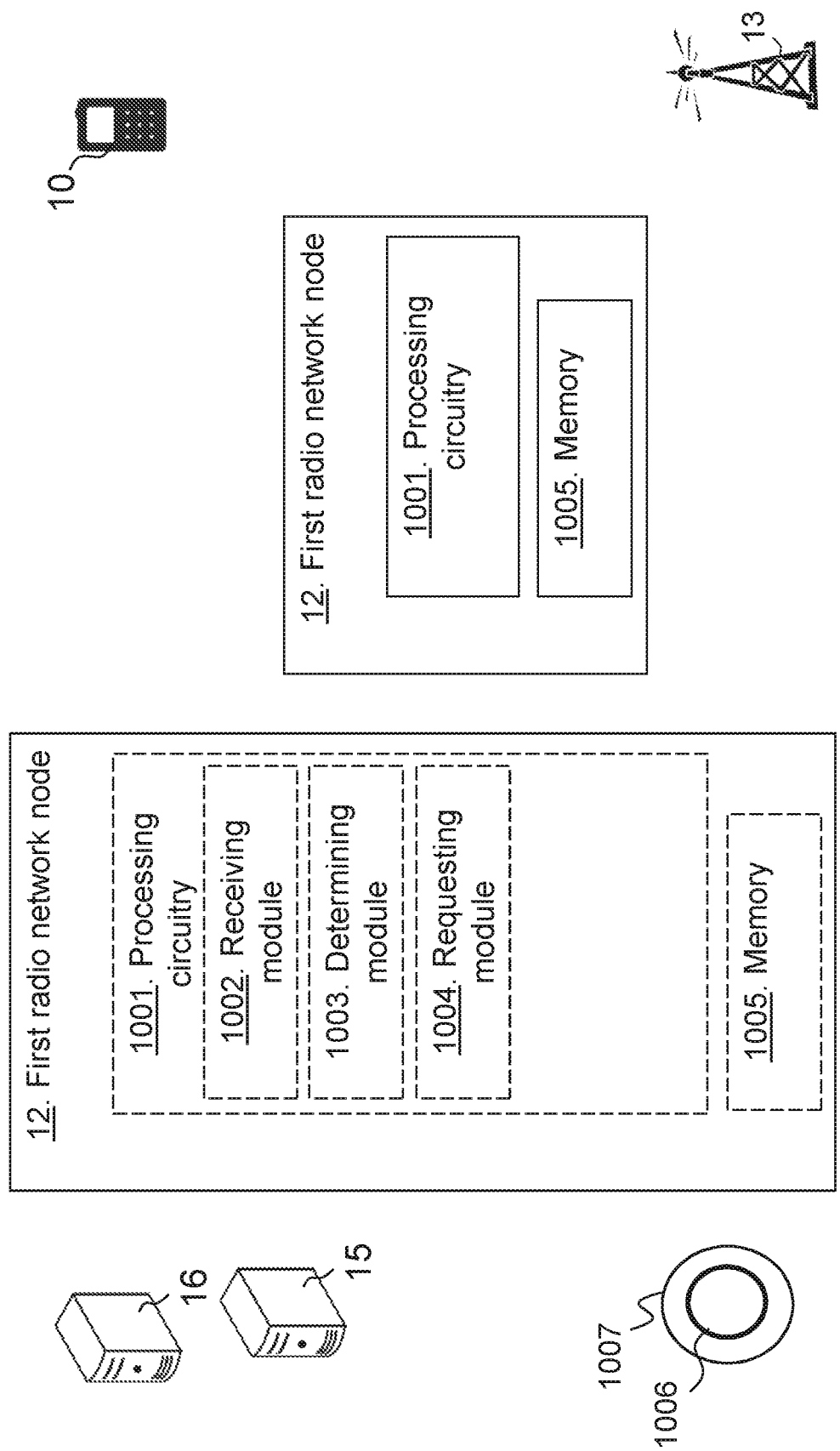
FIG. 11 is a block diagram depicting a first radio network node according to embodiments herein.

The methods according to the embodiments described herein for the second radio network node 13/first network node 15 are respectively implemented by means of e.g. a computer program 905 or a computer program product, comprising instructions, i.e., software code portions, which, when executed on at least one processor, cause the at least one processor to carry out the actions described herein, as performed by the second radio network node 13/first network node 15. The computer program 905 may be stored on a computer-readable storage medium 906, e.g. a disc or similar. The computer-readable storage medium 906, having stored thereon the computer program, may comprise the instructions which, when executed on at least one processor, cause the at least one processor to carry out the actions described herein, as performed by the second radio network node 13/first network node 15. In some embodiments, the computer-readable storage medium may be a non-transitory computer-readable storage medium FIG. 11 is a block diagram depicting the first radio network node 12 for handling, e.g. facilitating, neighbour relationships between radio network nodes in the wireless communication network 1 according to embodiments herein.

The first radio network node 12 may comprise a processing circuitry 1001, e.g. one or more processors, configured to perform the methods herein.

The first radio network node 12 may comprise a receiving module 1002, e.g. a receiver or transceiver. The first radio network node 12, the processing circuitry 1001 and/or the receiving module 1002 is configured to receive the measurement report from the wireless device, wherein the measurement report comprises the identity of the reference signal measured by the wireless device. The first radio network node 12, the processing circuitry 1001 and/or the receiving module 1002 may be configured to receive from the wireless device the ID of the RS handler.

The first radio network node 12 may comprise a determining module 1003. The first radio network node 12, the processing circuitry 1001 and/or the determining module 1003 is configured to determine that the first radio network node 12 does not know nor recognize the identity of the reference signal in the measurement report. The first radio network node 12, the processing circuitry 1001, and/or the determining module 1003 may e.g. be configured to determine that a reported references signal such as the second MRS is unknown to the first radio network node 12.

The first radio network node 12 may comprise a requesting module 1004, e.g. a transmitter or transceiver. The first radio network node 12, the processing circuitry 1001 and/or the requesting module 1004 is configured to, in the case that the ID of the RS is not known, transmit the request to the second network node 16, which request requests for the transmission of the identifier of the reference signal handler associated with the identity of the reference signal in the measurement report. The first radio network node 12, the processing circuitry 1001, and/or the requesting module 1004 may e.g. be configured to request from the second network node 16 the activation of the transmission of the ID of the first network node 15 along with the reference signals from the second radio network node 13. The first radio network node 12, the processing circuitry 1001 and/or the requesting module 1004 may be configured to trigger a neighbour relationship establishment process to the second radio network node 13 based on the received ID of the RS handler.

The first radio network node 12 may be configured to serve the wireless device by providing radio coverage over the first service area 11 or beam using the first reference signal for identifying the first service area 11 in the wireless communication network 1. The second radio network node 13 may be configured to provide radio coverage over the second service area 14 using the second reference signal for identifying the second service area 14 in the wireless communication network 1.

The first radio network node 12 further comprises a memory 1005. The memory comprises one or more units to be used to store data on, such as strengths or qualities, MRSs, applications to perform the methods disclosed herein when being executed, and similar.

The methods according to the embodiments described herein for first radio network node 12 are respectively implemented by means of e.g. a computer program 1006 or a computer program product, comprising instructions, i.e., software code portions, which, when executed on at least one processor, cause the at least one processor to carry out the actions described herein, as performed by the first radio network node 12. The computer program 1006 may be stored on a computer-readable storage medium 1007, e.g. a disc or similar. The computer-readable storage medium 1007, having stored thereon the computer program, may comprise the instructions which, when executed on at least one processor, cause the at least one processor to carry out the actions described herein, as performed by the first radio network node 12. In some embodiments, the computer-readable storage medium may be a non-transitory computer-readable storage medium.

In some embodiments a more general term "radio network node" is used and it can correspond to any type of radio network node or any network node, which communicates with a wireless device and/or with another network node.

Examples of network nodes are NodeB, Master eNB, Secondary eNB, a network node belonging to Master cell group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node e.g. Mobility Switching Centre (MSC), Mobile Management Entity (MME) etc., Operation and Maintenance (O&M), Operation Support System (OSS), Self-Organizing Network (SON), positioning node e.g. Evolved Serving Mobile Location Centre (E-SMLC), Minimizing Drive Test (MDT) etc.

In some embodiments the non-limiting term wireless device or user equipment (UE) is used and it refers to any type of wireless device communicating with a network node and/or with another UE in a cellular or mobile communication system. Examples of UE are target device, device-to-device (D2D) UE, proximity capable UE (aka ProSe UE), machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are described for 5G. However the embodiments are applicable to any RAT or multi-RAT systems, where the UE receives and/or transmit signals (e.g. data) e.g. LTE, LTE FDD/TDD, WCDMA/HSPA, GSM/GERAN, Wi Fi, WLAN, CDMA2000 etc.

Measurement Reference Signal (MRS): As used herein, a "MRS" is any signal used for mobility measurements in Mobility measurement beams. Thus, while the term "MRS" is used herein to refer a signal used herein, the term "MRS" is to be construed broadly to mean any signal, regardless of what the signal is named, e.g., in any particular standard, used for mobility measurements and, in particular, used according to the embodiments described herein. In some embodiments, a MRS is a mobility specific signal that is used for handover/beam switching purposes. This reference signal can be periodic or aperiodic. It can be configured to be wireless device specific or could be used common for more than one wireless device.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

ABBREVIATIONS

ACK Acknowledged
ADC Analog-to-digital conversion
AGC Automatic gain control
ANR Automatic neighbour relations
AP Access point
BCH Broadcast channel
BLER Block error rate
BRS Beam Reference Signal
BS Base station
BSC Base station controller
BTS Base transceiver station
CA Carrier aggregation
CC Component carrier
CG Cell group
CGI Cell global identity
CP Cyclic prefix
CPICH Common pilot channel
CQI Channel Quality Indicator
CSG Closed subscriber group
CSI-RS Channel State Information Reference Signal
DAS Distributed antenna system
DC Dual connectivity
DFT Discrete Fourier Transform
DL Downlink
DL-SCH Downlink shared channel
DRX Discontinuous reception
EARFCN Evolved absolute radio frequency channel number
ECGI Evolved CGI
eNB eNodeB
FDD Frequency division duplex
FFT Fast Fourier transform
HD-FDD Half duplex FDD
HO Handover
ID Identity
M2M machine to machine
MAC Media access control
MCG Master cell group
MDT Minimization of drive tests
MeNB Master eNode B
MIB Master information block
MME Mobility management entity
MRS Mobility Reference Signal
MRTD Maximum receive timing difference
MSR Multi-standard radio
NACK Not acknowledged
OFDM Orthogonal frequency-division multiplexing
RI Rank Indicator
SI System Information
PCC Primary component carrier
PCI Physical cell identity
PCell Primary Cell
PCG Primary Cell Group
PCH Paging channel
PDU Protocol data unit
PGW Packet gateway
PHICH Physical HARQ indication channel
PLMN Public land mobile network
PMI Precoding Matrix Indicator
PSCell Primary SCell
PSC Primary serving cell
PSS Primary synchronization signal
RAT Radio access Technology
RF Radio frequency
RLM Radio link monitoring
RNC Radio network Controller
RRC Radio resource control
RRH Remote radio head
RRU Remote radio unit
RSCP Received signal code power
RSRP Reference Signal Received Power
RSRQ Reference Signal Received Quality
RSSI Received signal strength indication
RSTD Reference signal time difference
RV Redundancy version
Rx Receiver
SCC Secondary component carrier
SCell Secondary Cell
SCG Secondary Cell Group
SeNB Secondary eNode B
SFN System frame number
SGW Signalling gateway
SI System information
SIB System information block
SIB1 System information block type 1
SINR Signal to interference and noise ratio
SON Self-organizing networks
SSC Secondary serving cell
SSS Secondary synchronization signal
TA Timing advance
TAG Timing advance group
TDD Time division duplex
Tx Transmitter
UARFCN UMTS Absolute Radio Frequency Channel Number
UE User equipment
UL Uplink

The invention claimed is:

1. A method performed by a second network node for handling neighbour relationships between radio network nodes in a wireless communication network, the method comprising:
   initiating a neighbour relationship establishment process in the wireless communication network by transmitting an indication to a second radio network node or a first network node, which indication indicates the second radio network node to transmit an identifier of a reference signal handler associated with a reference signal of the second radio network node along with a transmission of the reference signal.

2. The method according to claim 1, wherein the initiating the neighbour relationship establishment is triggered by receiving a request, from a first radio network node, requesting for a transmission of the identity of the reference signal handler.

3. The method according to claim 1, wherein the initiating the neighbour relationship establishment process is triggered by the second network node.

4. The method according to claim 1, wherein the second radio network node is comprised in a subset of radio network nodes in an area.

5. A method performed by a second radio network node for handling neighbour relationships between radio network nodes in a wireless communication network, the method comprising:

receiving, from a first or second network node, an indication indicating to transmit an identifier of a reference signal handler associated with a reference signal of the second radio network node along with a transmission of the reference signal; and transmitting an identity, ID, of a reference signal, RS, handler in direct association with one or more RS of the radio network node.

6. The second network node according to claim 5, being configured to trigger the initiation of the neighbour relationship establishment process by being configured to receive a request, from a first radio network node, requesting for a transmission of the identity of the reference signal handler.

7. The second network node according to claim 5, being configured to trigger the initiation of the neighbour relationship establishment process by itself.

8. The second network node according to claim 5, wherein the second radio network node is comprised in a subset of radio network nodes in an area.

9. A second network node for handling neighbour relationships between radio network nodes in a wireless communication network, the second network node being configured to:

initiate a neighbour relationship establishment process in the wireless communication network by being configured to transmit an indication to a second radio network node or a first network node, which indication indicates the second radio network node to transmit an identifier of a reference signal handler associated with a reference signal of the second radio network node along with a transmission of the reference signal.

10. A second radio network node for handling neighbour relationships between radio network nodes in a wireless communication network, the second radio network node being configured to:

receive, from a first or second network node, an indication indicating to transmit an identifier of a reference signal handler associated with a reference signal of the second radio network node along with a transmission of the reference signal; and to transmit an identity, ID, of a reference signal, RS, handler in direct association with one or more RS of the radio network node.

* * * * *